United States Patent

[11] 3,557,974

| [72] | Inventor | George K. Ostrander |
| | | Angelica, N.Y. |
| [21] | Appl. No. | 795,231 |
| [22] | Filed | Jan. 30, 1969 |
| [45] | Patented | Jan. 26, 1971 |
| [73] | Assignee | The Air Preheater Company, Inc. |
| | | Wellsville, N.Y. |
| | | a corporation of Delaware |

[54] STORAGE APPARATUS AND CONTROL MEANS THEREFOR
5 Claims, 5 Drawing Figs.

[52] U.S. Cl. .................................................. 214/16.4, 214/730
[51] Int. Cl. .................................................. B65g 1/06
[50] Field of Search .......................................... 214/16.4, 16.42, 730

[56] References Cited
UNITED STATES PATENTS
| 3,049,247 | 8/1962 | Lemelson .................. | 214/16.4 |
| 3,268,097 | 8/1966 | Aimington et al. ........ | 214/16.4 |
| 3,389,814 | 6/1968 | Lemelson .................. | 214/16.4 |
| 3,486,640 | 12/1969 | Lemelson .................. | 214/16.4 |

FOREIGN PATENTS
| 1,229,454 | 11/1966 | Germany .................. |
| 1,008,071 | 10/1965 | Great Britain ............ |

Primary Examiner—Gerald M. Forlenza
Assistant Examiner—Raymond B. Johnson
Attorneys—Wayne H. Lang and Eldon H. Luther ABSTRACT: Material handling apparatus for transporting loads to and from selected storage locations and having a mode of operation providing automatic loading or unloading of a load at any one of a plurality of storage locations. The automatic control system includes means for establishing an initial reference point for each of said storage locations, means for determining the load condition of the material handling apparatus, and means to then effect an unload or load motion of the material handling apparatus, in response to the presence or absence of a load thereon. The loading and unloading of a load is accomplished in a rapid and accurate manner and avoids sliding contact between the load and the material handling apparatus.

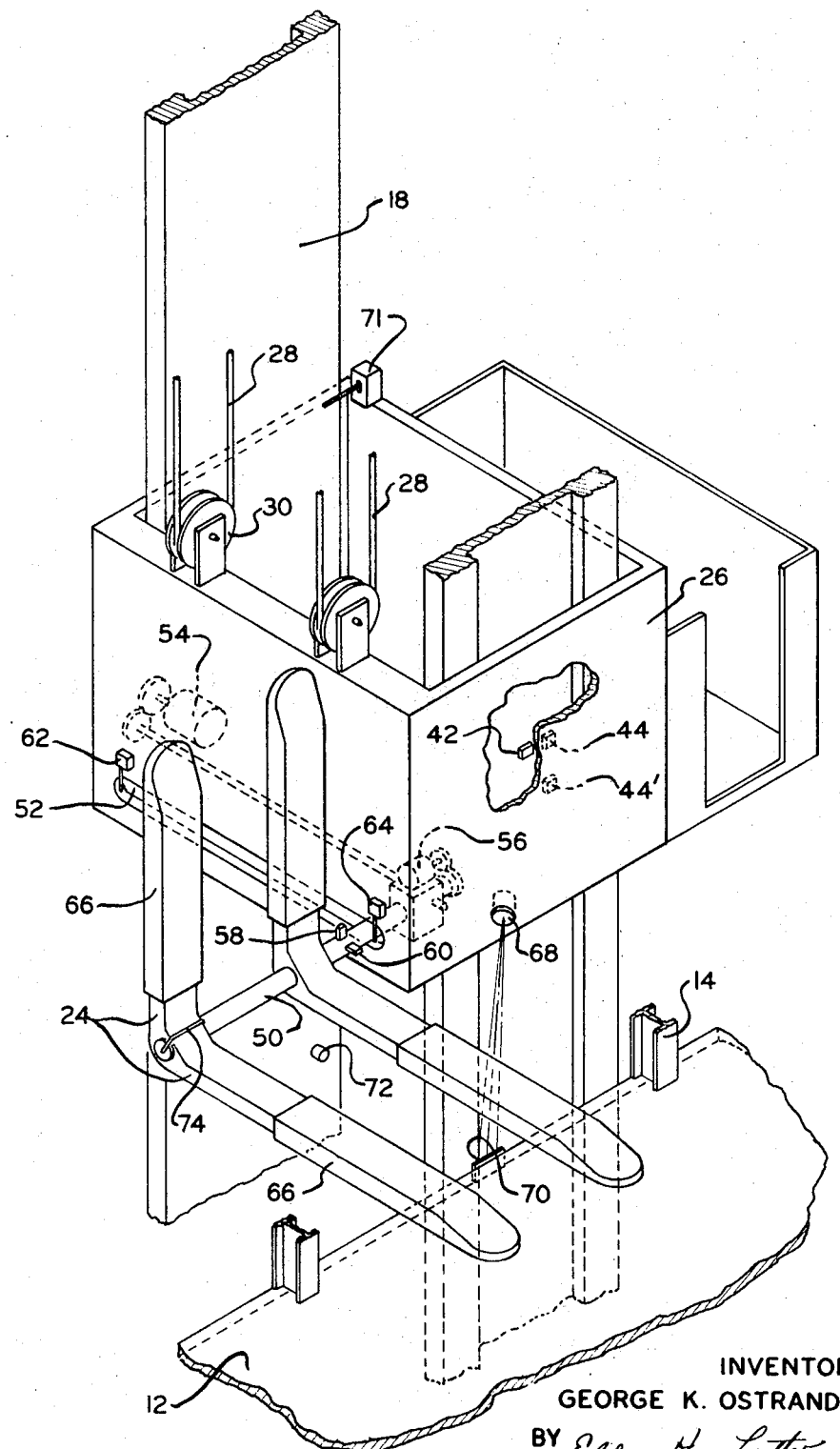

3,557,974

1

STORAGE APPARATUS AND CONTROL MEANS THEREFOR

BACKGROUND OF THE INVENTION

The present invention relates to apparatus for handling materials and transporting them to and from selected storage locations. More particularly, the present invention is directed to apparatus for automatically placing loads in or removing loads from any of a plurality of storage locations. Accordingly the general objects of the present invention are to provide new and improved methods and apparatus of such character.

The present invention finds particular application in the field of material handling and, more particularly, in systems where there are a plurality of storage locations for the storage materials. One of the most common means for supporting materials that are to be transported and so stored on pallets. These pallets may then be lifted and moved by various types of material handling apparatus generally having a fork which extends into and supports the pallet. For the purpose of this application, the term "load" will refer to the combination of the pallet and the material supported thereon.

Earlier material handling systems employed wheeled, fork lift vehicles which were almost entirely manually and visually controlled by an operator. The occasional inaccuracies and relative slowness of operation occasioned through use of human operators suggested development of systems which rely less upon the human senses and judgment and more upon electrical and mechanical sensing and actuating means.

More recently, material handling systems employing varying degrees of automation have been developed. These systems have generally found application in large warehousing areas in which a plurality of vertically spaced horizontal shelves are located. These shelves are usually further subdivided laterally into bins and each bin is capable of containing at least one load. The load transporting apparatus is permitted to move in a lateral direction by means of overhead or floor mounted tracks supporting said apparatus. Vertical movement of the supporting portion of the load transporting apparatus occurs along a vertically extending mast member. Various types of automatic control systems have permitted operation of these load transporting apparatus with a reduced degree of human control. This has resulted in a more accurate and expeditious transferral of loads to and from the storage area.

One of the functions in such a load handling system is that of transferring the load from the load transporting apparatus to an individual storage bin and vice versa. For such a function, the load supporting portion of the apparatus will be located immediately adjacent the bin into which or from which the load is to be transferred. The actual transferral has generally relied upon a series of manual control functions performed by a human operator, though recent systems have reduced some of the functions of the operator through automation.

Automatic or semiautomatic systems, though serving in some measure to expedite the load transferral operation, have had several shortcomings. One shortcoming is in the need for human control through various phases of the load transferral operation. Another being the inaccurate determination of load elevations when the bin shelf members have varying amount of sag due to loading or unevenness of the warehouse floor. Failure to compensate for changes in the bin shelf elevation may result in damage to the bin, the load, or the load carrying apparatus.

SUMMARY OF THE INVENTION

In accordance with the present invention, a load transfer control system is provided which requires a minimum of operator participation and a maximum of accuracy, speed, and safety. This invention includes means to detect small changes in bin shelf elevation and means responsive thereto for adjusting the transferral operation accordingly. The foregoing and other improvements precipitated by the present invention are provided by apparatus which includes means for establishing an initial reference point for each of the storage bins, at which point operation in each of said bins begins and ends and means for establishing a second reference point for each bin which is indicative of the elevation of the support shelf of the particular bin selected. The transfer operation is entirely automatic and is effected electromechanically. The load supporting portion of the load transporting apparatus will undergo a motion which is rectangular in geometry and return to the initial reference point. The load supporting portion, when loaded, will first extend into the bin area, then drop the distance required to place the load on the bin shelf and free the load supporting portion, then withdraw from the bin area, and return to the initial reference point. The operation is exactly reversed when a load is to be removed from the bin area. The "load" or "unload" mode of transfer operation is determined by load sensing means. The load fork accomplishes contact-free insertion into or withdrawal from the pallet portion of the load on the bin shelf by means which detect the bin shelf elevation and position the load fork accordingly.

BRIEF DESCRIPTION OF THE DRAWINGS

FIG. 3 provides a detailed view of the carriage and extendible load forks of the load carrying apparatus;

DESCRIPTION OF THE PREFERRED EMBODIMENT

Figure 1:
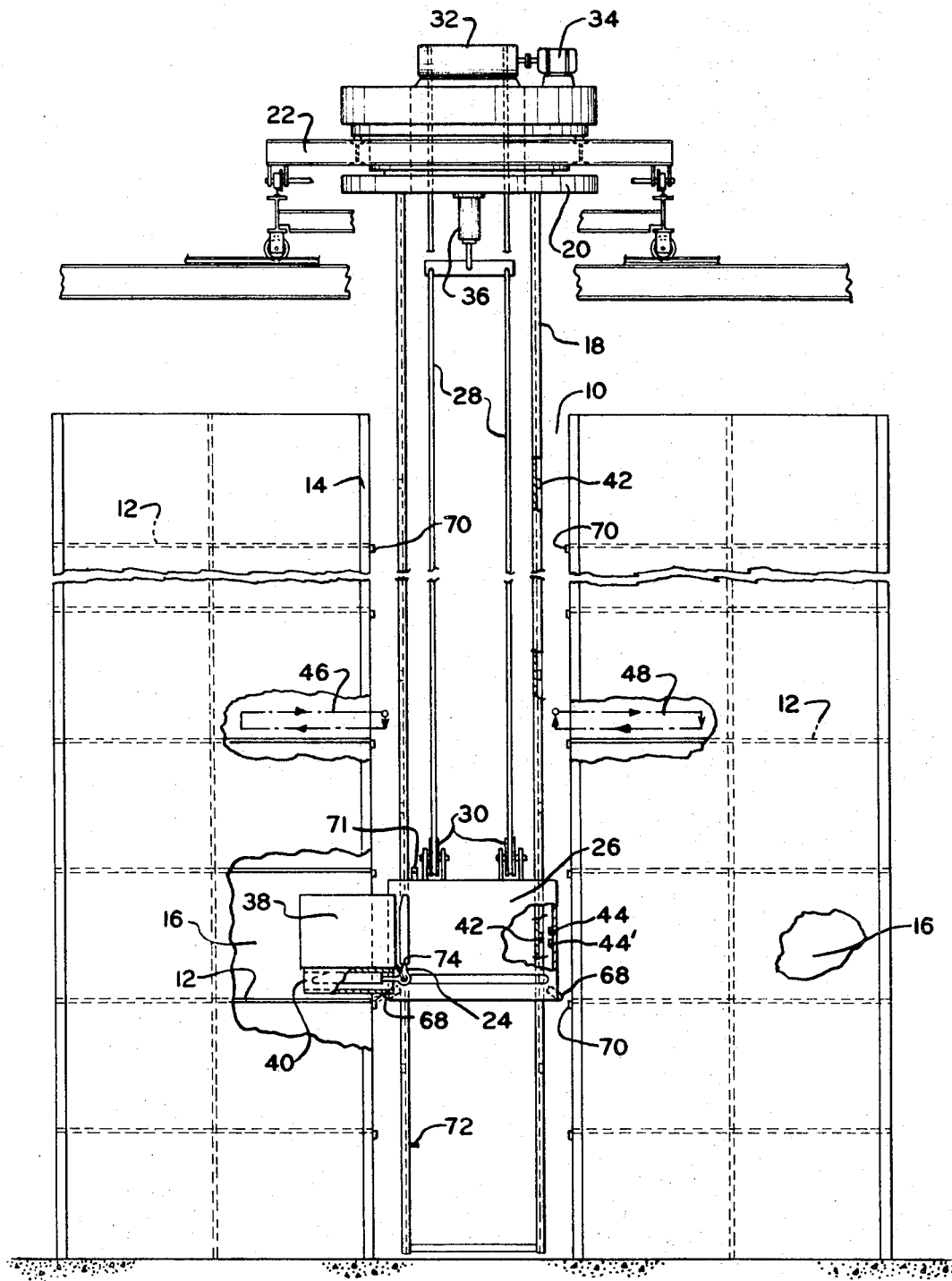
FIG. 1 is a front elevation of the load transporting apparatus of the invention in as an aisle adjacent a plurality of storage bins.

Referring now to FIG. 1, an exemplary warehousing system employing the automatic control system of this invention comprises a storage area in which there exists a plurality of storage racks, each rack being separated by an aisle 10. Each rack is comprised of a plurality of horizontal support shelves 12 which are vertically spaced and supported by a plurality of laterally spaced, vertical support members 14, which subdivide the racks into bins 16.

The load transport apparatus of my invention is of the type known generally as a stacker crane and consists of a vertically extending mast 18 joined to turn table 20 which in turn is a component portion of an overhead carrier 22. Carrier 22 is motor driven and adapted to travel on overhead rails in a warehouse in a manner permitting general freedom of motion by mast 18 in the horizontal plane and, more specifically, to permit motion of mast 18 along as aisle 10, parallel the load receiving ends of bins 16. This type of stacker crane generally employs load forks 24 as the load supporting structure of the apparatus. Forks 24 are supported and carried by vertically movable carriage 26. Mast 18 serves as a track or guide along which carriage 26 moves. Carriage 26 is supported and elevated by means of a pair of cables 28, through pulleys 30. Cables 28 are attached at one end to a takeup drum 32 driven by a reversible motor 34 and at the other end to a hydraulic equalizer 36, which will be discussed more fully below.

This particular type of stacker crane, having load forks 24 is especially suited for handling and transporting materials on pallets the palletized materials being hereinafter referred to as load 38. The spacing between the fork engaging surface of pallet 40 and the shelf engaging portion of said pallet is sufficient to permit contact-free insertion or withdrawal of load fork 24 in initiating or completing transfer of the load.

In the stacker crane of my invention electrical and mechanical controls permit an operator to "drive" the crane to a selected bin location in which a load is to be deposited or from which a load is to be retrieved. Mast 18 proceeds down the aisle 10 to the vertical column of bins 16 which contain said selected bin. Sensing of the different vertical bin columns is accomplished in the same manner as is employed in determining elevation of the selected bin and will be described more thoroughly below.

Figure 2:
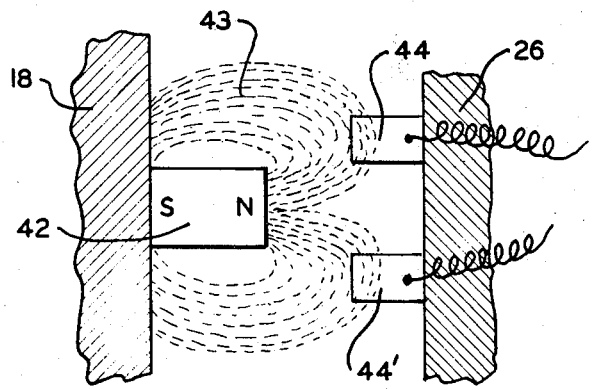
FIG. 2 is a front elevation of the magnet and sensors which provide a vertical reference for a bin.

Upon, or while, reaching the position within the horizontal plane at which said selected bin is located, the operator will "-drive" the carriage 26 along mast 18 to the elevation of said selected bin. This elevation is determined by means of magnets 42 positioned along mast 18 and detected by a pair of sensing heads 44 and 44' affixed to carriage 26, more clearly seen in FIGS. 2 and 3. Each of magnets 42 is positioned, with respect to a bin 16 in a vertical bin column, in a manner defining an initial elevational reference point for each of said bins 16. FIG. 2 illustrates the principle by which the initial elevational reference point of each of bins 16 is accurately determined. Magnet 42 and sensors 44 and 44' are situated in the same general vertical plane and FIG. 2 is a side elevation of these elements in that plane. The lines of magnetic force provide the resultant field pattern 43 in the plane of the FIG. Field pattern 43, as seen in the plane of FIG. 2, has two distinct lobes which extend axially beyond the N. pole of magnet 42 and diverge from the axis of said magnet to create a conical void in the field pattern along said axis. Magnetic flux responsive sensors 44 and 44' such as magnetic oscillators, reed switches, or the like, are of such vertical spacing with respect to one another and of such distance from the N. pole of magnet 42 that they both contact activating portions of the magnetic field only when the axis of said magnet is midway between them. Thus, concurrent activation of both sensors will be an accurate indication of a position at the axis of magnet 42; whereas activation of only one will indicate a position somewhat above or below said axis. This initial reference point provides a starting and finishing location for the automatic transfer operation and is positioned such that there will always be vertical clearance above and below forks 24 and load 38, regardless of sag to shelves 12, during lateral motion of the loaded forks. Further, this initial reference point has a constant elevation for each of bins 16, with respect to mast 18.

Upon reaching the initial elevational reference point of the selected bin 16, carriage 26 is stopped. The operator then actuates the automatic loading or unloading of load 38. This function is accomplished by automatically controlling the lateral extension or withdrawal of load fork 24 and the vertical positioning of carriage 26. The path of the motion performed by load fork 24 is as shown at 46 (FIG. 1) when loading and as at 48 when unloading. In each instance the fork tip begins at zero, the initial reference point for a selected bin.

FIG. 3 shows a feature of my system which permits transport operation to bins on either side of aisle 10 without movement of carriage 26 or mast 18 upon arriving at a particular position in aisle 10. Load forks 24 exist as a first and second pair, radially affixed to a common support arm 50 and disposed 90° from one another. Arm 50 extends horizontally through slot 52 in carriage 26 and is supported in cantilevered fashion by said carriage. Forks 24 may be rotated through an angle of 90° by means of an hydraulic actuator 56 which rotates support arm 50 through an angle of 90° about its longitudinal axis. Fork "flipped" limit switches 58 and 60 respectively indicate when the fork is oriented in a right of left operational position thus enabling automatic control of the transport motion to bins on either side of aisle 10. When one pair of forks 24 is in load supporting use, the other serves as a back stop for the load and, unless stated otherwise, reference to forks 24 will mean those in the load supporting position.

Forks 24 enter and leave the selected bin 16 by means of lateral motion imparted to support arm 50 by motor 54 in carriage 26. The motor 54 is coupled to arm 50, as by a screw and threaded collar, to provide said lateral motion to either side of aisle 10. Forks 24 may traverse from one side of a carriage 26 to the other, as limited by the width of slot 52. Right- and left-side limit switches 62 and 64, respectively, are positioned at the two lateral extremes of travel of support arm 50 to sense the extreme lateral positions of said support arm.

Additional lateral extension of the load bearing forks 24 is effected by hydraulically extending the end or tip portions, 66, of said forks. This operation occurs concurrently with lateral motion of arm 50 and increases the distance of lateral movement of a load 38 by several inches.

A second elevational reference point is established for each of bins 16. This second reference point, unlike the previous mentioned initial reference point, is not at a constant elevation with respect to mast 18. The second reference point will vary in elevation for a particular bin 16 as the elevation of the support shelf 12 of said bin varies due to loading, floor unevenness, etc., with said reference point remaining a constant distance above said shelf. The second reference point is established at an elevation such that load forks 24 operating laterally at that elevation may enter or leave a bin in which there is a load 38 without contacting any portion of the pallet 40 or the shelf 12. This position is chosen to be between the top of pallet 40 and its supporting shelf 12 such that no load bears on load forks 24 while they are being inserted or withdrawn from under said pallet.

Establishment and detection of said second elevational reference point is effected through use of an electrooptical detector 68 affixed to carriage 26 and signal reflective tape 70 affixed to supporting shelf 12. Detector 68 may be a retro-light such as the Retro-reflector Scanner of the Farmer Electric Products Company, Inc. This optical detection system emits a narrow beam of light. When this beam of light contacts reflective means, such as reflective tape 70, a portion of the light is reflected back to detector 68 which is responsive only to light having a particular relationship with the emitted beam. A small piece of light responsive tape 70, affixed to shelf 12 such that it moves with said shelf, will serve to reflect the light beam signal. Detector 68 is positioned such that the transmitted beam passes beneath the extended forks 24 to the tape 70, is reflected, and is detected when forks 24 are at the elevation representative of the second elevational reference point. Because the light beam is narrow and because carriage 26 and forks 24 will always be moving downward at such time as said second reference point is to be detected, said reference point may be determined very accurately. Two detectors 68, one on each side of carriage 26, are used for determining the second elevational reference points for bins on either side of aisle 10.

In instances where the floor of the storage area is to be used for load storage, an alternate means of determining the second elevational reference point of the lower-most bin 16, may be employed. A lower limit switch 71 is mounted on carriage 26 and is actuated by trip 72 on mast 18 when the carriage and forks descend to the predetermined elevation of the second reference point of this lower-most of bins 16.

Motor 34, driving drum 32 serves to provide the relatively high speed, along distance vertical movement of carriage 26 when moving to or away from a selected bin 16. However, vertical movement of the carriage and load forks, when in the automatic load transfer mode of operation, is provided by a vertically extensible member, hydraulic equalizer 36 affixed to turn table 20. Equalizer 36 will extend sufficiently to provide the several inches of vertical motion required in the automatic transfer operation and eliminates the need for starting and stopping a large motor, such as motor 34, for short moves.

Load responsive switch 74 is affixed to the end portion of support arm 50 and load forks 24 and is positioned to detect the presence of a load on forks 24 in either the "flipped left" or "flipped right" operational positions. Switch 74 is normally open when the forks 24 are unloaded, as shown in FIG. 2. The presence of a load on forks 24 will act to deflect the arm of switch 74 in a clockwise or counterclockwise direction, depending on the orientation of said forks, to close switch 74 in either instance. This then serves to provide a control function in the automatic transfer mode of operation. Detection of the magnetic field by sensing head 44 will serve to open switch $M_1$ and close switch $M_2$ thus energizing light 80, and likewise, detection by sensor 44' will energize light 82. These visual indicators 80 and 82 enable the operator to move carriage 26 either upward or downward until both lights are energized, indicating centering upon the initial elevational reference point of any selected bin 16. Switches $M_3$ and $M_3'$ are closed only when said carriage is centered on a initial elevational reference point. Lateral bin centered centering will effect the same response from switches associated with sensors for determining positioning in the horizontal plane, not shown. Relay C is energized when in the automatic load transfer mode and not centered on the initial elevational reference point.

Figure 4A:
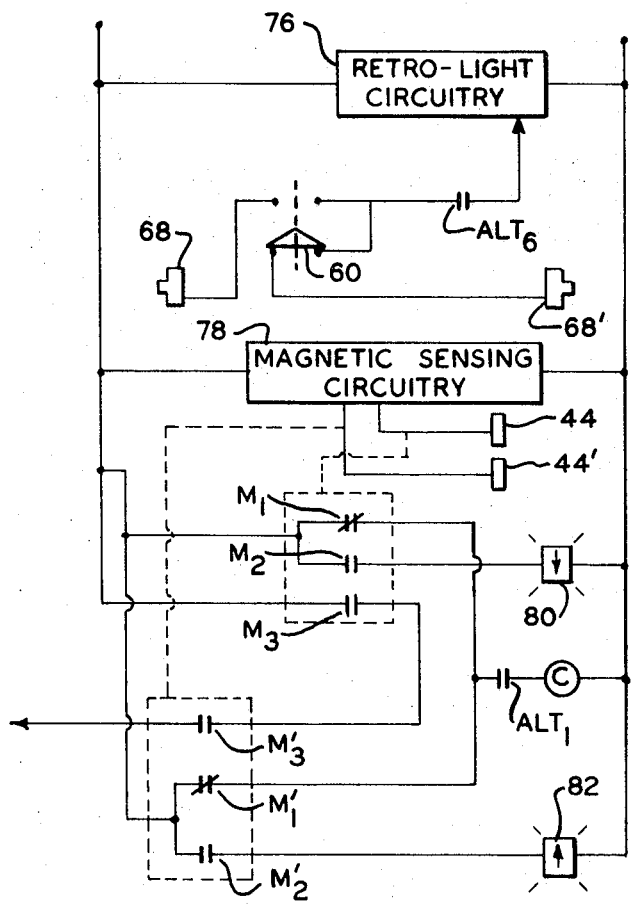
FIG. 4a is a schematic of the vertical position sensing circuitry.
Figure 4B:
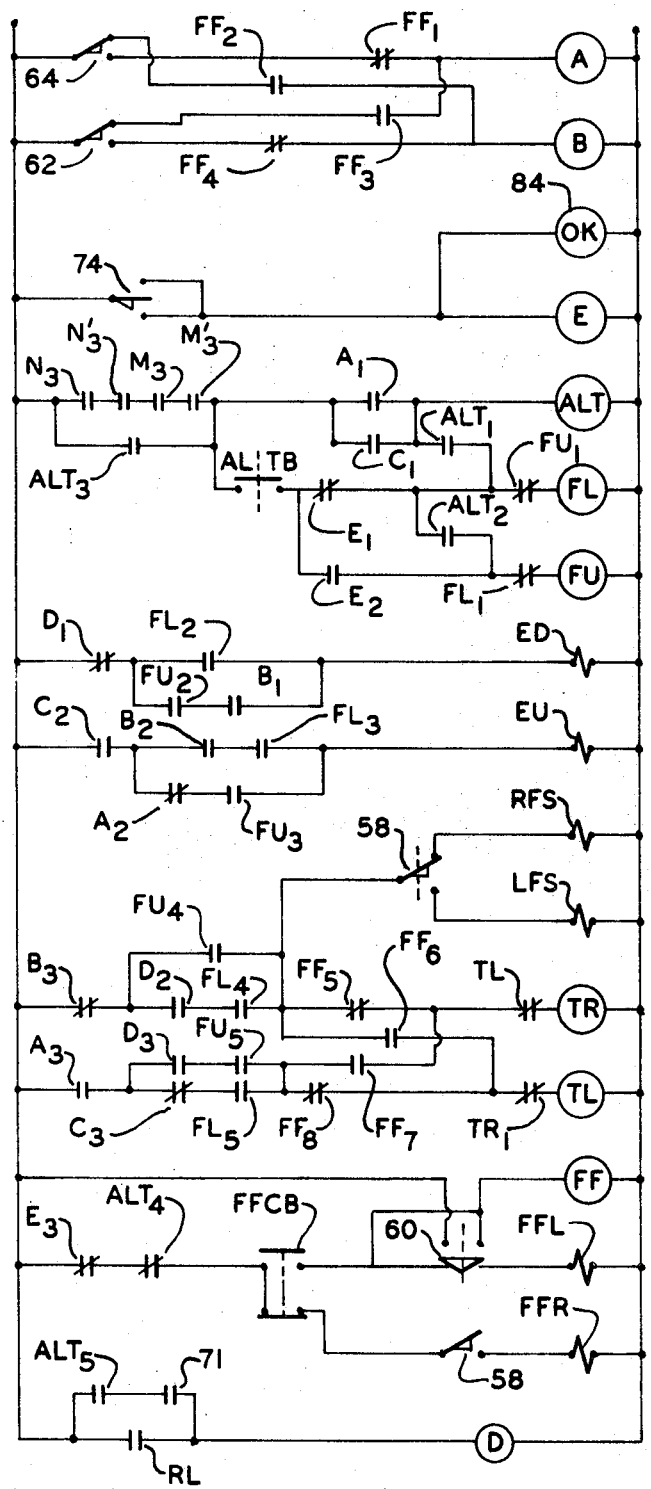
FIG. 4b is a schematic of the logic circuitry employed in automatically transferring loads.

The circuitry of FIGS. 4a and 4b is shown as comprising a plurality of function controlling or condition representing arms. The circuitry and its operation will be discussed through analysis of logic functions involved in the several arms. The circuit arms are comprised generally of relay switch contacts and controlling relays. Energization of a relay results in changing the state of the contacts controlled by that relay. The contacts have the same identifying initials as the controlling relay. An AC line voltage is applied across the several logic arms.

FIG. 4a shows the position detection circuitry in which retro-light detectors 68 and 68' are mounted on the left and right sides, respectively, of carriage 26 and are shown to be alternately connected to retro-light circuitry 76 through relay contact $ALT_6$ which is closed when operating in the automatic load transfer mode, by means of switch 60 which is responsive to the "flipped left" or "right" positioning of forks 24. In the schematic shown, the fork "flipped right" condition exists. Magnetic sensors 44 and 44' are shown connected to associated circuitry 78 which controls switches $M_1$, $M_2$, $M_3$, and $M_1'$, $M_2'$, $M_3'$, as shown.

FIG. 4b depicts the logic circuitry required to effect the automatic control of the load transporting apparatus in the load transfer mode of operation. Right and left side limit switches 62 and 64 are connected by means of contacts $FF_1$, $FF_2$, $FF_3$, and $FF_4$, as shown, to relays A and B. Relay A will be energized during the time that load forks 24 are not in a completely withdrawn limit position and relay B will be energized when said forks are in the full extended limit position, Because load forks 24 may be "flipped" to a right or left operation position, the "extended" and "withdrawn" positions of said forks will be reversed upon "flipping" from the one operational position to the other. Therefore, a particular direction of operation is established as "normal" and operation with the forks "flipped" in the opposite direction serves to reverse some of the logic. This is accomplished by means of relay FF which is not energized during the "fork flipped right" mode of operation, but is energized by means of "fork flipped left" limit switch 60 during the "fork flipped left" mode of operation. Thus, the normally closed contacts $FF_1$, and $FF_4$ will be closed during "fork flipped right" operation and contacts $FF_2$ and $FF_3$ will close during "fork flipped left" operation.

Load responsive switch 74 is seen to control relay E which will be energized to indicate the presence of a load on forks 24 when switch 74 is in either of the closed contact positions resulting from detection of a load on the forks. Switch 74 remains open, as shown, when there is no load on forks 24. Signal light 84 provides a visual indication that a load has been detected by switch 74.

Relay ALT is energized during the automatic load transfer mode of operation and serves a logic enabling function during that mode of operation. Switches $M_3$ and $M_3'$ will close when the carriage is centered at the initial elevational reference point. Switches $N_3$ and $N_3'$ are controlled by the horizontal reference positioning circuitry, which is not shown, and function in the same manner as switches $M_3$ and $M_3'$ when the lateral reference position of a selected bin 16 is centered upon. Thus energization of relay ALT may not occur until lateral and elevational centering on a selected bin have occurred. Further control of relay ALT if effected by paralleled contacts $A_1$ and $C_1$, wherein $A_1$ is closed for lateral fork positions other than fully withdrawn and $C_1$ is closed during the automatic load transfer mode when said forks are at an elevation other than the initial reference point. Relays FL and FU, respectively, serve to provide the load command and unload command control.

The automatic load transfer operation is initiated by the operator actuating push button ALTB to provide a current path to either relay FL or FU, as determined by the state of contacts $E_1$ and $E_2$. A fork loaded condition will enable relay FL to be energized; whereas relay FU will be energized for a fork unload condition. Contacts $FU_1$ and $FL_1$ serve to prevent concurrent energization of relays FL and FU. Contacts $ALT_1$ and $ALT_2$ will be closed during the automatic load transfer operation and will provide a current path to relays FL and FU when the current path established by ALTB is broken. The operator must maintain button ALTB in an actuated position for a brief period sufficient to initiate extension or dropping of forks 24, one or the other of which will serve to close contacts $A_1$ or $C_1$ to energize relay ALT.

Solenoids ED and EU, respectively, serve to control the hydraulically actuated downward and upward movements of hydraulic equalizer 36. Solenoid ED, when actuated, effects downward movement of the equalizer and, accordingly, carriage 26 and load forks 24. Solenoid EU, when actuated, effects a reverse, upward movement back to the starting position. Contact $D_1$ which is controlled by relay D permits energization of solenoid ED at elevations other than the second elevational reference point of a bin, while contacts $FL_2$, $FU_2$, and $B_1$ serve to limit the energization to the required downward movement in the load and unload modes of operation. Contact $C_2$ permits energization of solenoid EU at elevations other than the initial elevational reference point of a bin, while contacts $A_2$, $FU_3$, $B_2$, and $FL_3$ serve to limit the energization to the required upward movement in the load and unload modes of operation.

Relays TR and TL, respectively, serve to effect fork travel right and fork travel left by closing circuits to the travel right and travel left contactors of motor 54. The logic circuitry including contacts $B_3$, $FU_4$, $D_2$, and $FL_4$ control the extending motion of forks 24 at either the first or second reference point elevations, depending on the load condition of said forks. The logic circuitry including contacts $A_3$, $D_3$, $FU_5$, $C_3$ and $FL_5$ control the withdrawing motion of forks 24 at either the first or second reference point elevation, depending on the load condition of said forks. Because forks 24 may be oriented in a right or left operational position, the direction of travel by fork 24 in an extending motion when oriented in the right operation position will be opposite that of the extending motion motion when oriented in the left operational position. This requires a reversal of the control logic to the relays TR and TL upon "flipping" forks 24 from one position to the other. This reversal is effected by means of contacts $FF_5$, $FF_6$, $FF_7$, and $FF_8$. Contacts $TL_1$ and $TR_1$ prevent concurrent energization of relays TR and TL. Solenoids RFS and LFS, respectively, serve to control the hydraulically actuated tip portions 66 of right operational and left operational forks 24. The "fork flipped right" limit switch 58 provides circuit continuity to either relay RFS or LFS, as determined by the existing orientation of load forks 24.

Relay FF, previously mentioned, will be energized by actuation of limit switch 60 to close the circuit to said relay. This actuation of limit switch 60 will occur when forks 24 are "flipped" to the left operational position. Therefore, energization of relay FF will be indicative of the "fork flipped left" mode of operation.

During the "fork flipped right" mode of operation, limit switch 60 will close a portion of the current path to solenoid FFL which controls "flipping" or rotating forks 24 to the left. Likewise, limit switch 58 will serve to close a portion of the current path to solenoid FFR which controls "flipping" or rotating forks 24 to the right. Forks 24 may be "flipped" from right to left or left to right upon actuation of the flip fork command button FFCB by the operator. Contacts $E_3$ and $ALT_4$ ensure that forks 24 may not be "flipped" at any time while in the automatic load transfer mode of operation or at any time said forks are in an extended position.

Relay D will be energized by contact RL at such time as the retro-light circuitry 76 of FIG. 4a detects the second elevational reference point of a bin. Contact $ALT_5$ and switch 71, in parallel with contact RL, energize relay D when the second elevational reference point of a bottom bin is detected by lower limit switch 71.

The sequence of operation the automatic load transfer mode, for the starting conditions shown in the circuitry of FIG. 4b, will now be described. Load responsive switch 74 indicates no load on forks 24 and "fork flipped left" limit switch 60 is in the position representative of the "fork flipped right" operational position, therefore a loading operation in the "fork flipped right" position will occur. Horizontal and vertical centering on the initial reference point of a selected bin will close switches $N_3$, $N_3'$, $M_3$, and $M_3'$ and, upon actuation of push button ALTB, relay FL will be energized through contact $E_1$. Solenoid ED will then be energized through $D_1$ and contact $FL_2$, now closed, and will permit carriage 26 and load forks 24 to drop until contact RL of the retro-light circuitry is closed, at which time relay D will become energized and contact $D_1$ will open. At this time fork travel to the right will begin through energization of relay TR controlled by contacts $B_3$, $D_2$ now closed, $FL_4$ now closed, $FF_5$ and $TL_1$. Simultaneously, right fork end portion 66 will extend by means of solenoid RFS energized through switch 58. This extension of forks 24 occurs until right side limit switch 62 is contacted and energizes relay B through contact $FF_4$, thus indicating the fork extended limit position. Contact $B_3$ will open, thus stopping further extension of forks 24. Solenoid EU will be energized through contacts $C_2$, $B_2$, and $FL_3$, all now closed and the carriage, forks, and load will move upward. This upward movement will continue until the initial elevational reference point is again reached, at which time contact $C_2$ will open. Fork travel to the left will now begin by energization of relay TL through contacts $A_3$, $C_3$, $FL_5$, $FF_8$, and $TR_1$. Withdrawal of the forks will continue until the starting point is reached, at which time left side limit switch 64 will be contacted and will break the current path to relay A through contact $FF_1$, thereby opening contact $A_3$. The unloading to the right, unloading to the left, and loading to the left sequences of operation will be readily apparent and should require no further explanation.

Additional circuitry of an elementary nature, not shown, may be employed, and to some extent coupled to the circuitry of FIG. 4b, to permit manual control of forks 24 by the operator, particularly for movements in the lateral direction. However, such manually controlled movements are contemplated only in areas other than in aisles 10 and electrical or mechanical safety interlocks may be provided to allow operation only in the automatic load transfer mode while within aisle 10.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. In a system for transporting loads to and from selected storage locations, the apparatus comprising: a plurality of vertically spaced horizontal support shelves supported by a plurality of laterally spaced vertical members to form a plurality of storage bins having load receiving ends; load transporting means movable past said load receiving ends, said load transporting means including a vertical mast member movable in the horizontal plane, a vertically movable carriage guided by said mast member, load support means carried by said carriage and movable laterally to extend into and to withdraw from said load receiving end of said bins; first reference means associated with said mast member and said carriage for establishing and detecting an initial elevational reference point for each of said bins; second reference means associated with said carriage and each of said bins for establishing and detecting a second elevational reference point lower than said first for each of said bins; first position responsive means for indicating an extended limit position of said load support means; second position responsive means for indicating a withdrawn limit position of said load support means; power means for actuating said mast member, carriage, and load load support means; control means for effecting movement of said load transporting means to the horizontal position of a selected bin and said carriage to said initial elevational reference point of said selected bin; and automatic control means for effecting loading and unloading movements of said load support means including, a first sequence control for unloading movements wherein said load support means is extended into said selected bin to said extended limit position, is lowered to said second elevational reference point, is withdrawn from said bin to said withdrawn limit position, and is raised to said initial elevational reference point, and a second sequence control for loading movements wherein load support means is lowered to said second elevational reference point, is extended into said bin to said extended limit position, is raised to said initial elevational reference point, and is withdrawn from said bin to said withdrawn limit position, said automatic control means including load sensing means operatively connected to said load support means for detecting load condition thereon and selecting said first or said second sequence of operation accordingly.

2. The apparatus of claim 1 wherein said second reference means comprise: signal reflective means operatively affixed to each of said bins at the load receiving end of the support shelf thereof; and signal transmitting and sensing means operatively attached to a vertically movable portion of said load transporting means for transmitting a narrow beam signal and sensing means being only the reflected return of said signal, said transmitting and sensing means being positioned with respect to said reflective means to detect said second reference point when said load support means is a fixed distance above the support shelf of a selected bin.

3. The apparatus of claim 2 wherein said load support means comprise: first fork means for loading and unloading in a first lateral direction; and second fork means for loading and unloading in a second opposite lateral direction, said first and second fork means being radially affixed in 90° spaced relationship to a horizontally extending support member, said support member being movably supported by said carriage to permit linear motion transversely of said carriage by said member and 90° rotational motion of said member about its longitudinal axis; and said power means for actuating said load support means include a motor for imparting said linear motion to said support and hydraulic means for imparting said 90° rotational motion to said member whereby said first and second fork means may be operated in said first and said second lateral directions, respectively.

4. The apparatus of claim 2 wherein said power means for actuating said carriage include first elevational positioning means controlled by said control means for effecting vertical motion of said carriage to and from said selected bin; and second elevational positioning means controlled by said automatic control means for effecting vertical movement of said carriage in said first and second sequence movements.

5. The apparatus of claim 4 wherein said first reference means comprise a plurality of magnets, each of said magnets being operatively affixed to said mast member at a different elevation, each elevation being representative of a fixed vertical reference point for each of said bins; and a pair of closely spaced, vertically aligned magnetic flux responsive devices affixed to said carriage to pass in proximity to said magnets, said devices providing a bin reference point indication when concurrently energized by any one of said magnets.

PO-1050
(5/69)

UNITED STATES PATENT OFFICE
CERTIFICATE OF CORRECTION

Patent No. 3,557,974          Dated January 26, 1971

Inventor(s) George K. Ostrander

It is certified that error appears in the above-identified patent and that said Letters Patent are hereby corrected as shown below:

| | |
|---|---|
| Column 1, line 16 | delete "so" following "and". |
| Column 1, line 16 | insert --is-- following "stored". |
| Column 5, line 69 | following "ALT" delete "if" and insert --is-- therefore. |
| Column 8, line 33 | delete "means being" before "only' |

Signed and sealed this 9th day of May 1972.

(SEAL)
Attest:

EDWARD M. FLETCHER, JR.
Attesting Officer

ROBERT GOTTSCHALK
Commissioner of Patents